United States Patent
Ashizawa

(10) Patent No.: US 7,802,554 B2
(45) Date of Patent: Sep. 28, 2010

(54) DIRECT INJECTION SPARK IGNITION INTERNAL COMBUSTION ENGINE AND METHOD FOR CONTROLLING SAME

(75) Inventor: Takeshi Ashizawa, Yokohama (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/304,279

(22) PCT Filed: Sep. 27, 2007

(86) PCT No.: PCT/IB2007/002818

§ 371 (c)(1),
(2), (4) Date: Dec. 11, 2008

(87) PCT Pub. No.: WO2008/038118

PCT Pub. Date: Apr. 3, 2008

(65) Prior Publication Data

US 2009/0271092 A1    Oct. 29, 2009

(30) Foreign Application Priority Data

Sep. 29, 2006    (JP)    ................ 2006-268926

(51) Int. Cl.
*F02B 31/00*    (2006.01)
(52) U.S. Cl. ........................ 123/301; 123/436
(58) Field of Classification Search ........... 123/301, 123/305, 306, 298, 435–436
See application file for complete search history.

(56) References Cited

U.S. PATENT DOCUMENTS

| 5,860,597 | A | 1/1999 | Tarr | |
|---|---|---|---|---|
| RE37,633 | E | 4/2002 | Fuseya | |
| 6,705,279 | B2 * | 3/2004 | Iriya | ............... 123/301 |
| 7,597,085 | B2 * | 10/2009 | Ashizawa et al. | ............ 123/301 |
| 2002/0100453 | A1 | 8/2002 | Idogawa et al. | |
| 2003/0127531 | A1 | 7/2003 | Hohl | |
| 2005/0205052 | A1 | 9/2005 | Blessing et al. | |
| 2005/0252494 | A1 | 11/2005 | Rauznitz et al. | |
| 2009/0126682 | A1 * | 5/2009 | Ashizawa | ................ 123/299 |
| 2009/0194066 | A1 * | 8/2009 | Ashizawa et al. | ........... 123/295 |
| 2010/0012081 | A1 * | 1/2010 | Ashizawa | ................ 123/301 |

FOREIGN PATENT DOCUMENTS

| DE | 197 55 062 | 6/1999 |
|---|---|---|
| EP | 1 229 235 | 8/2002 |
| FR | 2 821 122 | 8/2002 |
| JP | 9 68072 | 3/1997 |
| JP | 2003-106202 | 4/2003 |
| JP | 2004 19569 | 1/2004 |

(Continued)

*Primary Examiner*—Hai H Huynh
(74) *Attorney, Agent, or Firm*—Oblon, Spivak, McClelland, Maier & Neustadt, L.L.P.

(57) ABSTRACT

A direct injection spark ignition internal combustion engine includes a fuel injection valve and fuel injection control device that controls fuel injection such that a fuel is injected from an upper area of an engine cylinder toward a top face of a piston through the fuel injection valve. The fuel injection control device switches a thrust force of the fuel injected from the fuel injection valve between at least two levels such that the thrust force of the injected fuel becomes weaker when the position of the piston is high than when the position of the piston is low.

14 Claims, 4 Drawing Sheets

FOREIGN PATENT DOCUMENTS

| | | |
|---|---|---|
| JP | 2004-162577 | 6/2004 |
| JP | 2005 54733 | 3/2005 |
| WO | 01 57392 | 8/2001 |
| WO | 03 081018 | 10/2003 |
| WO | 2005 001267 | 1/2005 |

* cited by examiner

DIRECT INJECTION SPARK IGNITION INTERNAL COMBUSTION ENGINE AND METHOD FOR CONTROLLING SAME

BACKGROUND OF THE INVENTION

1. Field of the Invention

The invention relates to a direct injection spark ignition internal combustion engine and a method for controlling the same.

2. Description of the Related Art

When homogenous combustion is performed by injecting fuel on each intake stroke in a direct injection spark ignition internal combustion engine in which fuel is directly injected into each cylinder, the required amount of fuel can be reliably injected into each cylinder as compared to in an internal combustion engine in which fuel is injected into each intake port. However, when fuel is injected toward the top face of each piston, the injected fuel may attach the top face of the piston, and if the fuel on the top face of the piston is not vaporized by the time of ignition and thus fails to be combusted, it produces smoke.

A technology has been proposed in which, in order to suppress the production of smoke, the thrust force of injected fuel is weakened at a low engine temperature where the likelihood that the injected fuel will attach the top face of each piston is low (For example, refer to Japanese Patent Application Publication No. 09-68072).

According to this technology, the amount of fuel that would attach each piston can be reduced by reducing the thrust force of the injected fuel when the engine temperature is low. However, at a high engine temperature where the thrust force of the injected fuel is strengthened, especially when a large amount fuel is injected, a large amount of fuel attaches the top face of each piston. If most of the fuel on the piston is not vaporized by the time of ignition, a large amount of smoke will be produced.

SUMMARY OF THE INVENTION

The invention provides a direct injection spark ignition internal combustion engine and a method for controlling the same, which sufficiently suppresses the production of smoke.

A first aspect of the invention relates to a direct injection spark ignition internal combustion engine including: a fuel injection valve; and fuel injection controlling means for controlling fuel injection such that a fuel is injected from the upper area of an engine cylinder toward the top face of a piston through the fuel injection valve. In this direct injection spark ignition internal combustion engine, the fuel injection controlling means switches a thrust force of the fuel injected from the fuel injection valve between at least two levels such that the thrust force of the injected fuel becomes weaker when the position of the piston is high than when the position of the piston is low.

According to the direct injection spark ignition internal combustion engine of the first aspect of the invention, during fuel injection, the thrust force of the injected fuel is switched between at least two levels such that the thrust force of the injected fuel becomes weaker when the position of the piston is high and therefore the likelihood that the injected fuel will attach the top face of the piston is high than when the position of the piston is low and the same likelihood is low. Therefore, the amount of fuel that would attach the top face of the piston is reduced sufficiently and thus the production of smoke is suppressed sufficiently. According to the direct injection spark ignition internal combustion engine of the first aspect of the invention, further, the thrust force of the injected fuel is strengthened when the position of the piston is low, which promotes the atomization of the injected fuel, so that the injected fuel vaporizes efficiently. This feature eliminates the possibility of a problem that, due to the thrust force of the injected fuel being weak, the overall fuel injection duration is extended to an extent that the time allowed for the vaporization of the injected fuel before the time of ignition becomes insufficient.

A second aspect of the invention relates to the direct injection spark ignition internal combustion engine of the first aspect of the invention, wherein the fuel injection controlling means changes a thrust force switching piston position, which is the position of the piston at which the thrust force of the injected fuel is switched, based on at least one of the engine load, the engine speed, and the engine temperature.

According to the direct injection spark ignition internal combustion engine of the second aspect of the invention, even if the likelihood that the injected fuel will attach the top face of the piston and the likelihood that the fuel on the top face of the piston will vaporize by the time of ignition vary due to changes in the engine load, the engine speed, and the engine temperature, the production of smoke can be suppressed by changing the thrust force switching piston position based on at least one of the engine load, the engine speed, and the engine temperature.

A third aspect of the invention relates to the direct injection spark ignition internal combustion engine of the second aspect of the invention, wherein the fuel injection controlling means changes the thrust force switching piston position such that the thrust force switching piston position is highest when the engine load is equal to a predetermined engine load, the thrust force switching piston position is lowered as the engine load decreases below the predetermined engine load, and the thrust force switching piston position is lowered as the engine load increases above the predetermined engine load.

In the direct injection spark ignition internal combustion engine of the third aspect of the invention, in the case where the injected fuel is least likely to attach the top face of the piston when the engine load is equal to the predetermined engine load, the thrust force switching piston position is set to the highest position when the engine load is equal to the set engine load. Further, as the engine load decreases below the predetermined engine load and thus the temperature of the piston decreases accordingly, the vaporization of the fuel on the top face of the piston becomes sluggish. Therefore, in the direct injection spark ignition internal combustion engine of the third aspect of the invention, the thrust force switching piston position is lowered as the engine load decreases below the predetermined engine load. Further, as the engine load increases above the predetermined engine load and the fuel injection amount is thus increased, the likelihood that the injected fuel will attach the top face of the piston increases. In the direct injection spark ignition internal combustion engine of the third aspect of the invention, therefore, the thrust force switching piston position is lowered as the engine load increases above the predetermined engine load.

A fourth aspect of the invention relates to the direct injection spark ignition internal combustion engine of the second aspect of the invention, wherein the thrust force switching piston position is changed such that the thrust force switching piston position is highest when the engine speed is equal to a predetermined engine speed, the thrust force switching piston position is lowered as the engine speed decreases below the predetermined engine speed, and the thrust force switching piston position is lowered as the engine speed increases above the predetermined engine speed.

In the direct injection spark ignition internal combustion engine of the fourth aspect of the invention, in the case where the time period allowed for the vaporization of the injected fuel before the time of ignition is sufficient when the engine speed is equal to the predetermined engine speed, the thrust force switching piston position is set to the highest position when the engine speed is equal to the predetermined engine speed. Further, as the engine speed decreases below the predetermined engine speed and thus the temperature of the piston decreases accordingly, the vaporization of the fuel on the top face of the piston becomes sluggish. Therefore, in the direct injection spark ignition internal combustion engine of the fourth aspect of the invention, the thrust force switching piston position is lowered as the engine speed decreases below the predetermined engine speed. Further, as the engine speed increases above the predetermined engine speed, the time period allowed for the vaporization of the fuel on the top face of the piston before the time of ignition shortens. In the direct injection spark ignition internal combustion engine of the fourth aspect of the invention, therefore, the thrust force switching piston position is lowered as the engine speed increases above the predetermined engine speed. As such, the production of smoke can be suppressed.

A fifth aspect of the invention relates to the direct injection spark ignition internal combustion engine of the second aspect of the invention, wherein the fuel injection controlling means lowers the thrust force switching piston position as the engine temperature decreases.

As the engine temperature decreases and thus the temperature of the piston decreases accordingly, the vaporization of the fuel on the top face of the piston becomes sluggish. In the direct injection spark ignition internal combustion engine of the fifth aspect of the invention, therefore, the thrust force switching piston position is lowered as the engine temperature decreases. As such, the production of smoke can be suppressed.

A sixth aspect of the invention relates to the direct injection spark ignition internal combustion engine of the first aspect of the invention, wherein: the internal combustion engine is configured such that the fuel injection valve is provided at substantially the center of the upper area of the engine cylinder or at the exhaust valve side of the periphery of the upper area of the engine cylinder; the fuel is injected toward the exhaust valve side of the top face of the piston through the fuel injection valve; at least when a required fuel amount that is determined based on the operation state of the internal combustion engine is within a given range, the fuel injection controlling means fixes a fuel injection duration to a crank angle range ranging from a first crank angle in the middle stage of an intake stroke as a timing for starting fuel injection to a second crank angle immediately before the bottom dead center on the intake stroke as a timing for ending the fuel injection; and the fuel injection controlling means switches the thrust force of the injected fuel between two levels, and changes the timing for switching the thrust force of the injected fuel such that the required fuel amount is injected.

According to the direct injection spark ignition internal combustion engine of the sixth aspect of the invention, because the internal combustion engine is configured such that the fuel injection valve is provided at substantially the center of the upper area of the engine cylinder or at the exhaust valve side of the periphery of the upper area of the engine cylinder and the fuel is injected toward the exhaust valve side of the top face of the piston through the fuel injection valve, the tumble flow flowing downward in the exhaust valve side of the engine cylinder and upward in the intake valve side can be effectively intensified. In order to intensify the tumble flow such that it remains active until the latter half of the compression stroke and thus the movement of air-fuel mixture in the engine cylinder remains strong until the time of ignition to increase the combustion speed, the fuel injection duration is preferably fixed to a crank angle range where the intake air amount per unit time is large. Therefore, in the direct injection spark ignition internal combustion engine of the sixth aspect of the invention, the fuel injection duration is fixed to a crank angle range ranging from the first crank angle in the middle stage of an intake stroke as the timing for starting fuel injection to the second crank angle immediately before the bottom dead center on the intake stroke as the timing for ending the fuel injection. Further, in the direct injection spark ignition internal combustion engine of the sixth aspect of the invention, the thrust force of the injected fuel is switched between two levels, and the timing for switching the thrust force of the injected fuel is retarded so that the duration for which fuel is injected with a small thrust force extends while the duration for which fuel is injected with a large thrust force shortens, whereby the fuel injection amount decreases. That is, the required fuel amount can be injected by appropriately setting the timing for switching the thrust force of the injected fuel.

A seventh aspect of the invention relates to a method for controlling a direct injection spark ignition internal combustion engine, including: switching, when a fuel is injected from the upper area of an engine cylinder toward the top face of a piston through the fuel injection valve, the thrust force of the injected fuel between at least two levels such that the thrust force of the injected fuel becomes weaker when the position of the piston is high than when the position of the piston is low.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
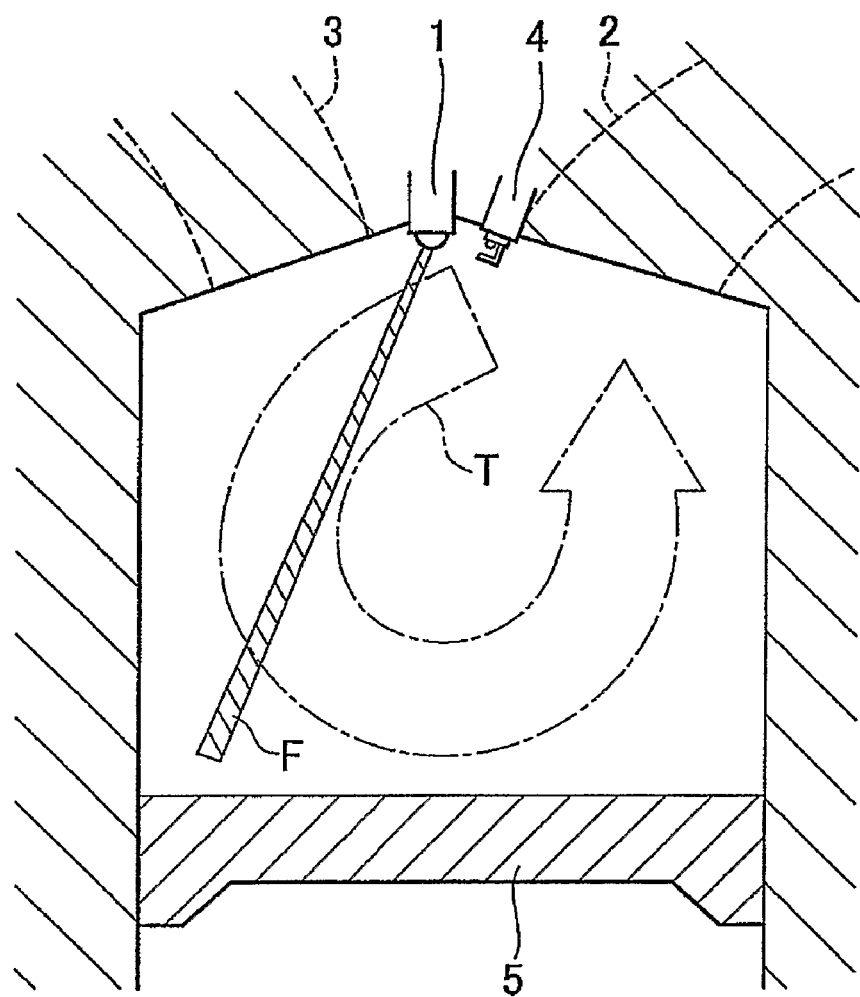
FIG. 1 is a vertical cross-sectional view schematically showing the structure of each cylinder of a direct injection spark ignition internal combustion engine according to an exemplary embodiment of the invention.

FIG. 1 is a vertical cross-sectional view schematically showing the structure of each cylinder of a direct injection spark ignition internal combustion engine according to an exemplary embodiment of the invention. Specifically, FIG. 1 shows a state immediately before the bottom dead center on an intake stroke (will be referred to as "intake stroke bottom dead center"). Referring to FIG. 1, a fuel injection valve 1 is provided at substantially the center of the upper area of each cylinder to inject fuel directly into the cylinder. Also, a pair of intake ports 2 communicating with the inside of the cylinder via a pair of intake valves (not shown in the drawings) and a pair of exhaust ports 3 communicating with the inside of the cylinder via a pair of exhaust valves (not shown in the drawings) are provided. In the cylinder, an ignition plug 4 is provided near the fuel injection valve 1 on the intake valve side thereof and a piston 5 is provided.

The fuel injection valve 1 injects fuel F obliquely downward toward the exhaust valve side portion of the top face of the piston 5. Because the ignition plug 4 is provided on the intake valve side of the fuel injection valve 1, the ignition plug 4 is not moistened by the injected fuel F and thus misfires of the ignition plug 4 due to moistening by the injected fuel F can be prevented. The thrust force of the fuel F injected from the fuel injection valve 1 is set such that the front end of the injected fuel F reaches the point at least 60 mm away from the lower valve end of the fuel injection valve 1 msec after the beginning of the fuel injection. As the injected fuel F having such a large thrust force moves obliquely downward from substantially the center of the upper area of the cylinder toward the exhaust valve side portion of the top face of the piston 5, the thrust force of the injected fuel F intensifies a tumble flow T that has been created in the cylinder and is flowing downward in the exhaust valve side of the cylinder and upward in the intake valve side.

The tumble flow T thus intensified remains active until the latter half of the compression stroke, whereby the movement of air-fuel mixture can be kept strong until the time of ignition that comes at the end of the compression stroke. The strong movement of air-fuel mixture increases the combustion speed, so that homogenous combustion progresses in a good condition. In this exemplary embodiment, in order to save the fuel consumption, the air-fuel ratio for homogenous combustion is set to a ratio that is leaner than the stoichiometric air-fuel ratio (preferably 20 or more, which suppresses the production of NOx), and therefore homogenous combustion tends to progress slowly. Thus, it is especially advantageous to increase the combustion speed as mentioned above. Meanwhile, the air-fuel ratio for homogenous combustion may alternatively be set to the stoichiometric air-fuel ratio or to a rich air-fuel ratio. In this case, too, increasing the combustion speed provides various advantages.

The shape into which fuel F is injected may be arbitrarily selected from among various shapes. For example, using a single injection hole, the fuel F can be injected into, for example, the shape of a solid or hollow cone. Further, using a slit-shaped injection hole, the fuel F can be injected into a relatively thin fan-like shape. Further, using an arc-slit-shaped injection hole, the fuel F can be injected into a relatively thin arc shape, the convex side of which faces the upper side and the exhaust valve side. Further, using a combination of two or more straight-slit-shaped injection holes, the fuel F can be injected into a zigzag shape. In short, the fuel F may be injected into any shape as long as the thrust force of the injected fuel F can be made large enough to accelerate the tumble flow T in the cylinder. Further, the fuel injection valve 1 may be provided on the exhaust valve side of the periphery of the upper area of the cylinder (e.g., between the two exhaust valves), rather than at substantially the center of the upper area of the cylinder, such that the fuel injection valve 1 injects fuel substantially straight downward toward the exhaust side portion of the top face of the piston 5.

Not only when intensifying the tumble flow T, whenever the fuel F is injected towards to the top face of the piston 5, the injected fuel may attach the top face of the piston 5, and if this attaching fuel is not vaporized by the time of ignition and thus fails to be combusted, it produces smoke. In this exemplary embodiment, the thrust force of the injected fuel is adjusted in at least two levels by controlling the lift of the valve body of the fuel injection valve 1 in at least two levels, etc. More specifically, when the piston 5 is at a high position while fuel is being injected from the fuel injection valve 1 and therefore there is a high likelihood that the injected fuel will attach the top face of the piston 5, the thrust force of the fuel injected from the fuel injection valve 1 (will be referred to as "fuel injection thrust force") is weakened as compared to when the piston 5 is at a low position and therefore the likelihood that the injected fuel will attach the top face of the piston 5 is relatively low. By doing so, the amount of fuel that would attach the top face of the piston 5 can be reduced, whereby the production of smoke is suppressed sufficiently.

On the other hand, when the piston 5 is at a low position, the fuel injection thrust force is strengthened, which promotes the atomization of the injected fuel, so that the injected fuel vaporizes efficiently. This feature eliminates the possibility of a problem that, due to the fuel injection thrust force being weak, the overall fuel injection duration is extended to an extent that the time allowed for the vaporization of the injected fuel before ignition becomes insufficient. In the case where the fuel injection thrust force is strengthened in order to intensify the tumble flow T as in this exemplary embodiment, at least when the fuel injection thrust force is strengthened while the piston 5 is at a low position, the fuel injection thrust force may be set such that the front of the injected fuel reaches the point at least 60 mm away from the lower valve end of the fuel injection valve 1 msec after the beginning of the fuel injection.

In order to control the lift of the valve body of the fuel injection valve 1 in multiple levels, for example, a structure may be employed in which the valve body of the fuel injection valve 1, which is urged by a spring, or the like, in the valve close direction, is opened by a piezoelectric strain actuator and the lift of the valve body is adjusted by controlling the voltage applied to the piezoelectric strain actuator in multiple levels. Alternately, a structure may be employed in which the valve body of the fuel injection valve 1 is opened by multi-step electromagnetic actuators and the lift of the valve body is adjusted by controlling the number of electromagnetic actuators to be used to open the fuel injection valve 1.

Figure 2:
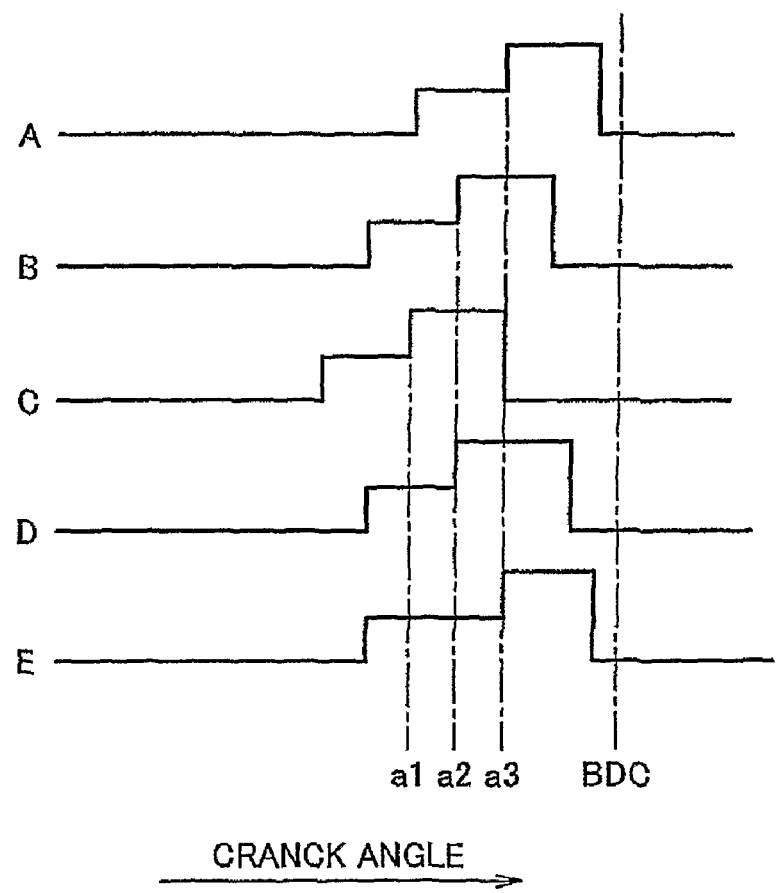
FIG. 2 is a view illustrating exemplary patterns for controlling the lift of the valve body of the fuel injection valve.

FIG. 2 illustrates valve lift control patterns A to E in each of which the lift of the valve body is controlled such that, when the piston 5 is at a high position, the fuel injection thrust force is made weaker than it is when the piston 5 is at a low position. In each pattern shown in FIG. 2, fuel injection is finished at a point before the intake stroke bottom dead center. In the patterns A, B, C, the small-lift valve-open duration and the large-lift valve-open duration, which are both defined as crank angle ranges, are equal to each other, and the fuel injection amount is equal in each pattern if the engine speed is equal (Strictly speaking, because the crankshaft does not rotate at a constant angular velocity, in order to inject an equal amount of fuel in each pattern, the angular velocity of the crankshaft shaft at each crank angle needs to be taken into consideration when setting the crank angle range as the valve open duration). The patterns A, B, C differ from each other in the crank angle at which the valve lift is switched from a small lift to a large lift. More specifically, the valve lift switching crank angle a3 of the pattern A, the valve lift switching crank angle a2 of the pattern B, the valve lift switching crank angle a1 of the pattern C are set in this order from the side of the intake stroke bottom dead center. That is, the position of the piston 5 at which the fuel injection thrust force is switched from a weak level to a strong level (will be simply referred to as "the piston position for switching the fuel injection thrust force") is highest in the pattern C, second highest in the pattern B, and lowest in the pattern A.

In the pattern D, the piston position (crank angle) for switching the valve lift is the same as that in the pattern B (i.e., the crank angle a2). However, in the pattern D, the crank angle range for the large lift valve opening is set longer than that in the pattern B. Therefore, if the engine speed is equal in each pattern, the fuel injection amount is larger in the pattern D than in the pattern B. Further, even when the engine speed is higher in the pattern D than in the pattern B, the fuel injection in the pattern D can be made equal to that in the pattern B. Meanwhile, in the pattern E, the piston position (crank angle) for switching the valve lift is the same as that in the pattern A (i.e., the crank angle a3). However, in the pattern E, the crank angle range for the small lift valve opening is set longer than it is in the pattern A. Therefore, if the engine speed is equal in each pattern, the fuel injection amount is larger in the pattern E than that in the pattern A. Further, even when the engine speed is higher in the pattern E than in the pattern A, the fuel injection in the pattern E can be made equal to that in the pattern A.

In any valve lift control pattern, when the piston 5 is at a high position during fuel injection, the fuel injection thrust force is made weaker than it is when the piston 5 is at a low position, and therefore the amount of fuel that would attach the top face of the piston 5 is small as compared to when the fuel injection thrust force remains strong even when the piston 5 is at a high position.

During homogenous combustion, the longer the time period before ignition is made by completing fuel injection earlier, the more sufficiently the injected fuel can be vaporized and thus mixed with air, that is, the more effectively homogenous air-fuel mixtures can be formed. Therefore, it is desirable to set the piston position for switching the fuel injection thrust force to a high position.

Figure 3:
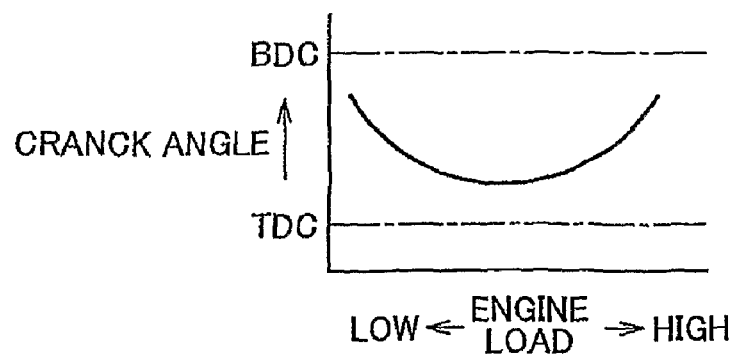
FIG. 3 is a map used to set the crank angle at which to switch the fuel injection thrust force in accordance with the engine load.

For this reason, when the engine load is medium, the piston position for switching the fuel injection thrust force is set to a relatively high position. However, when the engine load becomes low and therefore the temperature of the piston 5 becomes low, the vaporization of the fuel on the piston 5 becomes sluggish. At this time, therefore, the amount of smoke will increase unless the amount of fuel that would attach the piston 5 is reduced. In this exemplary embodiment, therefore, the lower the engine load, the lower the piston position for switching the fuel injection thrust force is made. On the other hand, when the engine load is high, the fuel injection amount is large and therefore the likelihood that the injected fuel will attach the top face of the piston 5 is high. In such a case, the amount of smoke will increase unless the amount of fuel that would attach the piston 5 is reduced. In this exemplary embodiment, therefore, the higher the engine load, the lower the piston position for switching the fuel injection thrust force is made. As such, by changing the piston position for switching the fuel injection thrust force according to the engine load as shown in FIG. 3, the production of smoke can be suppressed.

Figure 4:
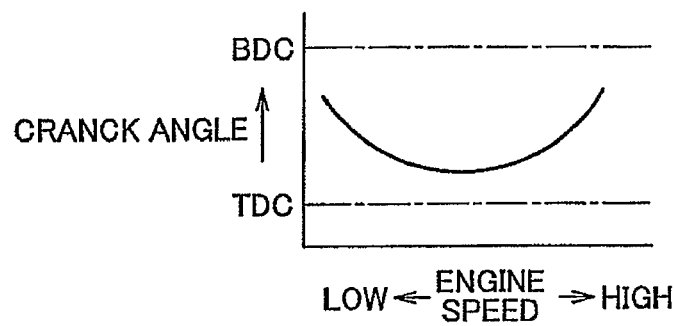
FIG. 4 is a map used to set the crank angle at which to switch the fuel injection thrust force in accordance with the engine speed.

Further, when the engine speed is medium, the piston position for switching the fuel injection thrust force is set to a relatively high position. However, when the engine speed has become low and thus the temperature of the piston 5 becomes low, the vaporization of the fuel on the piston 5 becomes sluggish. In such a case, the amount of smoke will increase unless the amount of fuel that would attach the piston 5 is reduced. In this exemplary embodiment, therefore, the lower the engine speed, the lower the piston position for switching the fuel injection thrust force is made. On the other hand, when the engine speed becomes high, the time period allowed for the vaporization of the fuel on the piston 5 becomes short. In this state, the amount of smoke will increase unless the amount of fuel that would attach the top face of the piston 5 is reduced. In this exemplary embodiment, therefore, the higher the engine speed, the lower the piston position for switching the fuel injection thrust force is made. As such, by switching the piston position for switching the fuel injection thrust force according to the engine speed as shown in FIG. 4, the production of smoke can be suppressed.

Figure 5:
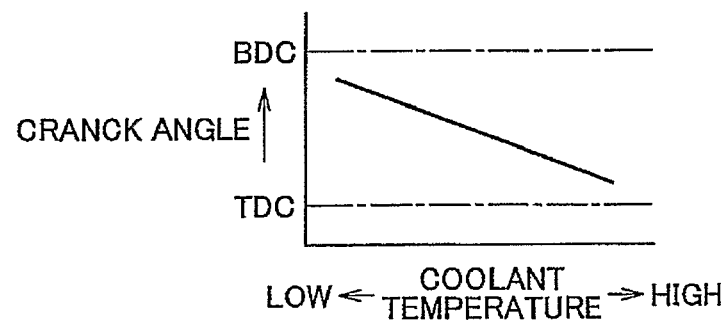
FIG. 5 is a map used to set the crank angle at which to switch the fuel injection thrust force in accordance with the coolant temperature.

Further, as the engine temperature decreases and thus the temperature of the piston 5 decreases, the vaporization of the fuel on the piston 5 becomes sluggish. In this state, the amount of smoke will increase unless the amount of fuel that would attach the top face of the piston 5 is reduced. In this exemplary embodiment, therefore, the lower the engine temperature, the lower the piston position for switching the fuel injection thrust force is made. As such, by switching the piston position for switching the fuel injection thrust force according to the coolant temperature indicating the engine temperature as shown in FIG. 5, the production of smoke can be suppressed.

Figure 6:
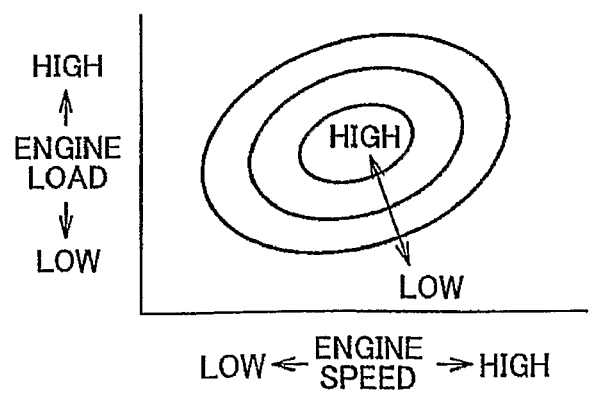
FIG. 6 is a map used to set the crank angle at which to switch the fuel injection thrust force in accordance with the engine load and the engine speed.

The piston position for switching the fuel injection thrust force may be set according to any of the engine load, the engine speed, and the engine temperature as described above. For example, it is possible to set the piston position for switching the fuel injection thrust force according to the engine load and the engine speed as illustrated the map of FIG. 6. Note that such a map may be provided for each level of the engine temperature.

Figure 7:
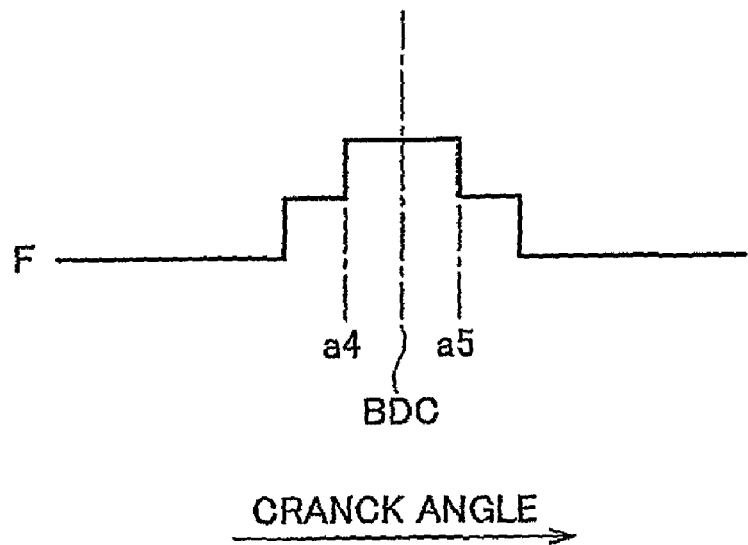
FIG. 7 is a view illustrating another pattern for controlling the lift of the valve body of the fuel injection valve.

FIG. 7 illustrates a valve lift control pattern F in which fuel injection is finished after the intake stroke bottom dead center. In the pattern F, the fuel injection duration after the intake stroke bottom dead center (the fuel injection duration on the compression stroke) is relatively long, and the fuel injection continues past the piston position on the compression stroke that corresponds to the piston position at which the fuel injection thrust force was switched from the small lift to the large lift on the preceding intake stroke. More specifically, in the pattern F, the valve lift is switched from the small lift to the large lift at the crank angle a4 that has been set as the piston position for switching the fuel injection thrust force on the intake stroke based on at least one of the engine load, the engine speed, and the engine temperature as described above, and the valve lift is then switched back from the large lift to the small lift at the crank angle a5 corresponding to the piston position on the compression stroke that is the same as the foregoing piston position on the intake stroke.

While the fuel injection thrust force is adjusted in two levels in the foregoing example, the fuel injection thrust force may be adjusted in three ore more levels, so that the fuel injection thrust force is intensified in a more stepped manner. In this case, the above-described technique is applied to the setting of the piston position at which the fuel injection thrust force is switched to the highest level. Further, the above-described technique may be applied to the setting of other piston positions for switching the fuel injection thrust force.

Figure 8:
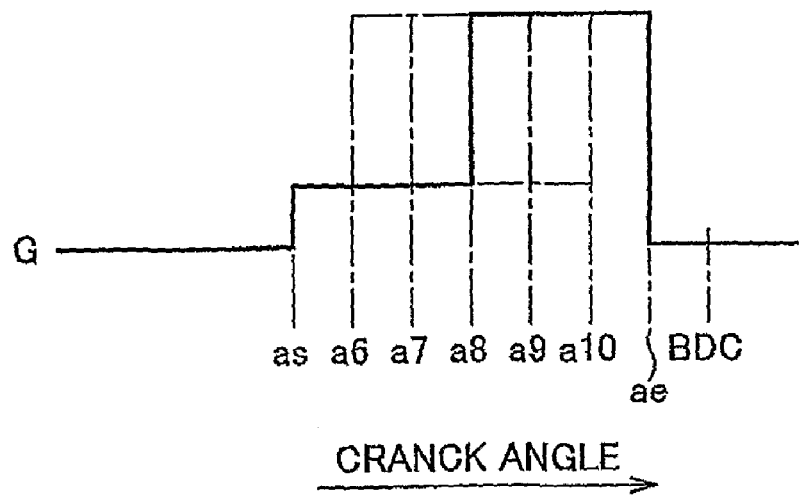
FIG. 8 is a view illustrating still another pattern for controlling the lift of the valve body of the fuel injection valve.

Meanwhile, when intensifying the tumble flow using the injected fuel, the tumble flow can be efficiently intensified if fuel is injected in a time period where the intake air amount per unit time is large, such as from the middle stage to the latter stage of the intake stroke. Therefore, in the case where the fuel injection valve is provided substantially at the center of the upper area of the cylinder or at the exhaust valve side of the periphery of the upper area of the cylinder and the tumble flow is intensified by injecting fuel from the fuel injection valve toward the exhaust valve side of the top face of the piston, the fuel injection duration may be set, irrespective of the required fuel injection amount, by fixing the fuel injection start timing to the first crank angle as in the middle stage of the intake stroke and fixing the fuel injection end timing to the second crank angle ae immediately before the intake stroke bottom dead center as indicated by the solid line in FIG. 8, so that the tumble flow is efficiently intensified by the injected fuel, provided that the required fuel amount that is determined based on the engine operation state defined by the engine load and the engine speed is within a predetermined range.

In the above case, too, the amount of smoke can be reduced if, for example, the fuel injection thrust force is adjusted in two levels such that when the piston 5 is at a high position and thus the likelihood that the injected fuel will attach the top face of the piston 5 is high, the fuel injection thrust force is made weaker than it is when the piston 5 is at a low position and thus the likelihood that the injected fuel will attach the top face of the 5 is low.

Further, in the case where the timing for switching the fuel injection thrust force is set at the crank angle a8, if the same timing is made closer to the intake bottom dead center by being retarded to, for example, a9 or a10, the fuel injection duration during which fuel is injected with a small thrust force extends while the fuel injection duration during which fuel is injected with a large thrust force shortens, whereby the fuel injection amount decreases. On the other hand, if the same timing is shifted away from the intake stroke bottom dead center by being advanced to, for example, *a* 7 or *a*6, the fuel injection duration during which fuel is injected with a small thrust force shortens while the fuel injection duration during which fuel is injected with a large thrust force extends, whereby the fuel injection amount increases. As such, even if the fuel injection duration is fixed, the necessary amount of fuel can be injected by changing the timing for switching the fuel injection thrust force. Meanwhile, when the engine speed is high, in order to inject a given amount of fuel, the crank angle at which to switch the fuel injection thrust force needs to be set more distant from the intake bottom dead center than it is when the engine speed is low.

In the case where the fuel injection thrust force is switched as described above, when fuel needs to be injected with a large thrust force, the fuel injection thrust force may be set such that the front end of the injected fuel reaches a point at least 60 mm away from the fuel injection valve 1 ms after the beginning of the fuel injection. Further, even when the fuel injection thrust force needs to be weakened, the fuel injection thrust force may be set as strong as possible in order to intensify tumble flows. Further, in the case where the crank angle range for injecting fuel is fixed as described above, if the fuel injection thrust force is adjustable between a small thrust force and a large thrust force, the minimum fuel injection amount and the maximum fuel injection amount that are obtained with the set fuel injection thrust force at each engine speed level are determined. That is, in this case, the range of the fuel amount that can be injected is determined, and therefore if the required fuel amount is out of this fuel injection amount range, it is impossible to perform fuel injection with the fixed fuel injection crank angle range. A common fuel injection amount range may be set for each engine speed level. In this case, however, the common fuel injection amount range needs to be made narrow. Therefore, a different fuel injection amount range may be set for each engine speed level.

The invention claimed is:

1. A direct injection spark ignition internal combustion engine comprising:
   a fuel injection valve; and
   a fuel injection control device that controls fuel injection such that a fuel is injected from an upper area of an engine cylinder toward the top face of a piston through the fuel injection valve,
   wherein the fuel injection control device switches a thrust force of the fuel injected from the fuel injection valve between at least two levels,
   wherein the thrust force of the injected fuel becomes weaker when the position of the piston is high in the engine cylinder compared to when the position of the piston is low in the engine cylinder,
   wherein the fuel injection control device changes a thrust force switching piston position, which is the position of the piston at which the thrust force of the injected fuel is switched, based on at least one of the engine load, the engine speed, and the engine temperature, and
   wherein the fuel injection control device changes the thrust force switching piston position such that the thrust force switching piston position is highest when the engine load is equal to a predetermined engine load, the thrust force switching piston position is lowered as the engine load decreases below the predetermined engine load, and the thrust force switching piston position is lowered as the engine load increases above the predetermined engine load.

2. The direct injection spark ignition internal combustion engine according to claim 1, wherein the predetermined engine load is set to a medium engine load.

3. The direct injection spark ignition internal combustion engine according to claim 1, wherein the fuel injection control device changes the thrust force switching piston position such that the thrust force switching piston position is highest when the engine speed is equal to a predetermined engine speed, the thrust force switching piston position is lowered as the engine speed decreases below the predetermined engine speed, and the thrust force switching piston position is lowered as the engine speed increases above the predetermined engine speed.

4. The direct injection spark ignition internal combustion engine according to claim 3, wherein the predetermined engine speed is set to a medium engine speed.

5. The direct injection spark ignition internal combustion engine according to claim 1, wherein the fuel injection control device lowers the thrust force switching piston position as the engine temperature decreases.

6. The direct injection spark ignition internal combustion engine according to claim 1, wherein:
   the internal combustion engine is configured such that the fuel injection valve is provided at substantially the center of the upper area of the engine cylinder or at the exhaust valve side of the periphery of the upper area of the engine cylinder;
   the fuel is injected toward the exhaust valve side of the top face of the piston through the fuel injection valve;
   at least when a required fuel amount that is determined based on the operation state of the internal combustion engine is within a given range, the fuel injection control device fixes a fuel injection duration to a crank angle range ranging from a first crank angle in the middle stage of an intake stroke as a timing for starting fuel injection to a second crank angle immediately before the bottom dead center on the intake stroke as a timing for ending the fuel injection; and the fuel injection control device switches the thrust force of the injected fuel between two levels, and changes the timing for switching the thrust force of the injected fuel such that the required fuel amount is injected.

7. A method for controlling a direct injection spark ignition internal combustion engine, comprising:

switching, when a fuel is injected from the upper area of an engine cylinder toward the top face of a piston through the fuel injection valve, the thrust force of the injected fuel between at least two levels, wherein the thrust force of the injected fuel becomes weaker when the position of the piston is high in the engine cylinder compared to when the position of the piston is low in the engine cylinder, wherein a thrust force switching piston position, which is the position of the piston at which the thrust force of the injected fuel is switched, is changed based on at least one of the engine load, the engine speed, and the engine temperature, and wherein the thrust force switching piston position is changed such that the thrust force switching piston position is highest when the engine load is equal to a predetermined engine load, the thrust force switching piston position is lowered as the engine load decreases below the predetermined engine load, and the thrust force switching piston position is lowered as the engine load increases above the predetermined engine load.

8. The method according to claim 7, wherein the thrust force switching piston position is changed such that the thrust force switching piston position is highest when the engine speed is equal to a predetermined engine speed, the thrust force switching piston position is lowered as the engine speed decreases below the predetermined engine speed, and the thrust force switching piston position is lowered as the engine speed increases above the predetermined engine speed.

9. The method according to claim 7, wherein the thrust force switching piston position is lowered as the engine temperature decreases.

10. The method according to claim 7, wherein:

the internal combustion engine is configured such that the fuel injection valve is provided at substantially the center of the upper area of the engine cylinder or at the exhaust valve side of the periphery of the upper area of the engine cylinder;

the fuel is injected toward the exhaust valve side of the top face of the piston through the fuel injection valve;

at least when a required fuel amount that is determined based on the operation state of the internal combustion engine is within a given range, a fuel injection duration is fixed to a crank angle range ranging from a first crank angle in the middle stage of an intake stroke as a timing for starting fuel injection to a second crank angle immediately before the bottom dead center on the intake stroke as a timing for ending the fuel injection; the thrust force of the injected fuel is switched between two levels; and the timing for switching the thrust force of the injected fuel is changed such that the required fuel amount is injected.

11. A direct injection spark ignition internal combustion engine comprising:

a fuel injection valve; and a fuel injection control device that controls fuel injection such that a fuel is injected from an upper area of an engine cylinder toward the top face of a piston through the fuel injection valve, wherein the fuel injection control device switches a thrust force of the fuel injected from the fuel injection valve between at least two levels, wherein the thrust force of the injected fuel becomes weaker when the position of the piston is high in the engine cylinder compared to when the position of the piston is low in the engine cylinder, wherein the fuel injection control device changes a thrust force switching piston position, which is the position of the piston at which the thrust force of the injected fuel is switched, based on at least one of the engine load, the engine speed, and the engine temperature, and wherein the fuel injection control device changes the thrust force switching piston position such that the thrust force switching piston position is highest when the engine speed is equal to a predetermined engine speed, the thrust force switching piston position is lowered as the engine speed decreases below the predetermined engine speed, and the thrust force switching piston position is lowered as the engine speed increases above the predetermined engine speed.

12. A direct injection spark ignition internal combustion engine comprising:

a fuel injection valve; and a fuel injection control device that controls fuel injection such that a fuel is injected from an upper area of an engine cylinder toward the top face of a piston through the fuel injection valve, wherein the fuel injection control device switches a thrust force of the fuel injected from the fuel injection valve between at least two levels, wherein the thrust force of the injected fuel becomes weaker when the position of the piston is high in the engine cylinder compared to when the position of the piston is low in the engine cylinder, wherein the internal combustion engine is configured such that the fuel injection valve is provided at substantially the center of the upper area of the engine cylinder or at the exhaust valve side of the periphery of the upper area of the engine cylinder, wherein the fuel is injected toward the exhaust valve side of the top face of the piston through the fuel injection valve, wherein at least when a required fuel amount that is determined based on the operation state of the internal combustion engine is within a given range, the fuel injection control device fixes a fuel injection duration to a crank angle range ranging from a first crank angle in the middle stage of an intake stroke as a timing for starting fuel injection to a second crank angle immediately before the bottom dead center on the intake stroke as a timing for ending the fuel injection, and wherein the fuel injection control device switches the thrust force of the injected fuel between two levels, and changes the timing for switching the thrust force of the injected fuel such that the required fuel amount is injected.

13. A method for controlling a direct injection spark ignition internal combustion engine, comprising:

switching, when a fuel is injected from the upper area of an engine cylinder toward the top face of a piston through the fuel injection valve, the thrust force of the injected fuel between at least two levels, wherein the thrust force of the injected fuel becomes weaker when the position of the piston is high in the engine cylinder compared to when the position of the piston is low in the engine cylinder, wherein a thrust force switching piston position, which is the position of the piston at which the thrust force of the injected fuel is switched, is changed based on at least one of the engine load, the engine speed, and the engine temperature, and wherein the thrust force switching piston position is changed such that the thrust force switching piston position is highest when the engine speed is equal to a predetermined engine speed, the thrust force switching piston position is lowered as the engine speed decreases below the predetermined engine speed, and the thrust force switching piston position is lowered as the engine speed increases above the predetermined engine speed.

14. A method for controlling a direct injection spark ignition internal combustion engine, comprising:

switching, when a fuel is injected from the upper area of an engine cylinder toward the top face of a piston through the fuel injection valve, the thrust force of the injected fuel between at least two levels, wherein the thrust force of the injected fuel becomes weaker when the position of the piston is high in the engine cylinder compared to when the position of the piston is low in the engine cylinder, wherein the internal combustion engine is configured such that the fuel injection valve is provided at substantially the center of the upper area of the engine cylinder or at the exhaust valve side of the periphery of the upper area of the engine cylinder, wherein the fuel is injected toward the exhaust valve side of the top face of the piston through the fuel injection valve, wherein at least when a required fuel amount that is determined based on the operation state of the internal combustion engine is within a given range, a fuel injection duration is fixed to a crank angle range ranging from a first crank angle in the middle stage of an intake stroke as a timing for starting fuel injection to a second crank angle immediately before the bottom dead center on the intake stroke as a timing for ending the fuel injection, wherein the thrust force of the injected fuel is switched between two levels, and wherein the timing for switching the thrust force of the injected fuel is changed such that the required fuel amount is injected.

* * * * *